United States Patent [19]

Eng et al.

[11] Patent Number: 5,107,493
[45] Date of Patent: Apr. 21, 1992

[54] HIGH-SPEED PACKET DATA NETWORK USING SERIALLY CONNECTED PACKET AND CIRCUIT SWITCHES

[75] Inventors: Kai Y. Eng, Shrewsbury Township, Monmouth County; Richard D. Gitlin, Little Silver, both of N.J.

[73] Assignee: AT&T Bell Laboratories, Murray Hill, N.J.

[21] Appl. No.: 389,191

[22] Filed: Aug. 2, 1989

[51] Int. Cl.⁵ .................................................. H04J 3/24
[52] U.S. Cl. ...................................... 370/94.1; 370/60
[58] Field of Search .................... 370/94.1, 60, 85.13, 370/15

[56] References Cited

U.S. PATENT DOCUMENTS

| | | | |
|---|---|---|---|
| 4,491,945 | 1/1985 | Turner | 370/60 |
| 4,494,231 | 1/1985 | Slawy et al. | 370/60 |
| 4,577,308 | 3/1986 | Larson et al. | 370/60 |
| 4,596,010 | 6/1986 | Beckner et al. | 370/60 |
| 4,688,209 | 8/1987 | Banzi, Jr. et al. | 370/15 |
| 4,707,826 | 11/1987 | Froggatt | 370/60 |
| 4,764,919 | 8/1988 | Hunter et al. | 370/94.1 |
| 4,771,425 | 9/1988 | Baran et al. | 370/94.1 |
| 4,809,265 | 2/1989 | Hart et al. | 370/85.13 |

*Primary Examiner*—Douglas W. Olms
*Assistant Examiner*—Dang Ton
*Attorney, Agent, or Firm*—Jeffrey I. Kaplan

[57] ABSTRACT

A cross connect network is utilized in order to switch packets of information among a plurality of network nodes. Each of the plurality of network nodes generates a multiplexed data signal, where each multiplexed data signal includes several channels. The cross connect network routes the data packets based upon which channel each packet is in when it arrives from the network node, rather than based upon the address in each packet. Thus, the need to read the address and switch the packet at each switching stage in the cross connect network is eliminated.

17 Claims, 5 Drawing Sheets

HIGH-SPEED PACKET DATA NETWORK USING SERIALLY CONNECTED PACKET AND CIRCUIT SWITCHES

FIELD OF THE INVENTION

The present invention relates to a technique for transmission of packetized information over high speed communications links; i.e. communications circuits.

DESCRIPTION OF THE PRIOR ART

The speed at which data transmission systems can operate has increased much more rapidly than that of packet switches and this trend is expected to continue for several years. As a result, packet switches cannot effectively utilize the large bandwidth of the transmission media to which they are connected. Many packet switch manufacturers have attempted to overcome the problem by manufacturing faster packet switches. One such fast packet switch is disclosed in U.S. Pat. No. 4,491,945, "Fast Packet Switch", issued to J. S. Turner on Jan. 1, 1985 and assigned to the same assignee as this application. In this switch, only a small predetermined portion of the address in each packet is examined by each packet switch that the packet traverses, rather than the entire address. Each packet switch then rotates the address bits in each packet so that the bits to be examined by the next packet switch in the network are in the proper predetermined portion. Further, the input buffers at each packet switch are variable length, and rather than storing the entire input packet and then retransmitting it to an output as prior art packet switches did, the packet switch only stores enough bits of the incoming packet to allow time for the next packet switch in the network to become available, at which time the stored bits and the rest of the incoming packet are transmitted to the next packet switch in the network. Thus, a large portion of the packet never gets buffered at each packet switch, and packets are routed through the packet network faster than was previously possible. However, the available bandwidth in modern transmission systems is much larger than even this fast packet switch can keep up with. Therefore, the problem that remains in the prior art is to provide a technique for utilizing high bandwidth transmission media to communicate data packets.

SUMMARY OF THE INVENTION

The foregoing problem of the prior art has been solved in accordance with the present invention which relates to a method and apparatus for high speed transmission of packetized data using packet switches interconnected by high speed communications links normally used for circuit communications, where several outputs of each packet switch are multiplexed onto a single high speed communications link. An exemplary embodiment of a communications network of the invention comprises (1) a plurality of packet switches each packet switch comprising (i) a plurality of inputs, and (ii) a plurality of outputs, (2) at least one multiplexing means associated with each packet switch for multiplexing data from several of the outputs of the packet switch onto a high speed communications link, (3) demultiplexing means associated with each packet switch for demultiplexing a multiplexed data signal received from a high speed communications link, and (4) at least one cross connect switch, for receiving multiplexed data signals from a plurality of multiplexing means, and creating new multiplexed signals, where each new multiplexed signal comprises data channels from one or more received multiplexed data signals. In operation, each packet switch routes all packets destined for other packet switches to those outputs of the packet switch which are connected to the inputs of a multiplexing means. Each multiplexing means then transmits a multiplexed data signal to a cross connect switch. The cross connect switch produces a new set of outgoing multiplexed data signals from the data received on channels of the incoming multiplexed data signals by directly transposing data from various channels of the incoming multiplexed data signals to new channels of new outgoing multiplexed data signals via semipermanent connections. Each outgoing multiplexed data signal comprises all of the data from the various different incoming multiplexed data signals which is destined for a separate particular packet switch. Each new multiplexed data signal is then transmitted to the particular packet switch for which its data is destined, where it is demultiplexed by an associated demultiplexing means.

DETAILED DESCRIPTION

Figure 1:
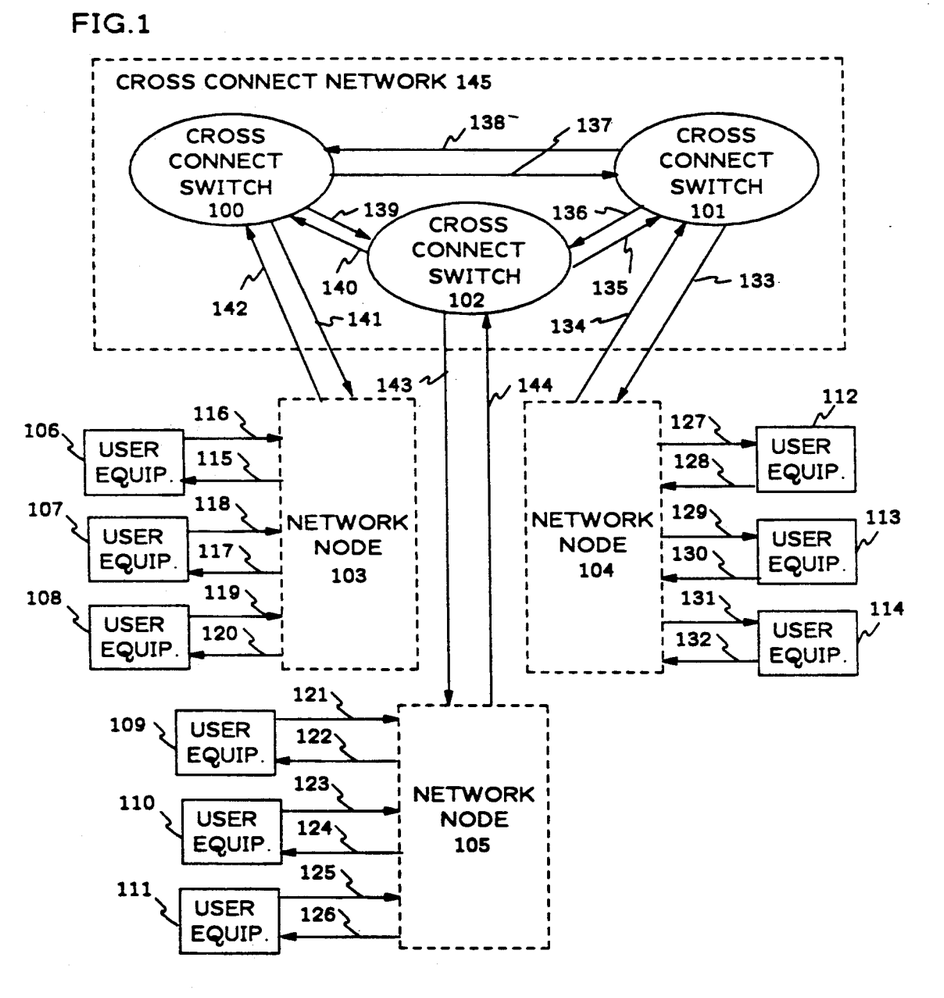
FIG. 1 shows a block diagram of an exemplary embodiment of the communications network of the invention.

FIG. 1 shows an exemplary arrangement of a preferred embodiment of the invention using three cross connect switches 100-102 interconnected to form cross connect network 145, network nodes 103-105, user equipment 106-114, and communications links 133-144. Each network node 103-105 is arranged to receive data packets, each of which includes a data field and an address field, from each of its associated user equipment 106-114, and to examine the address in each received data packet. If the address indicates that the user equipment to which the packet is destined is connected to the same network node, then the packet is routed back to the user equipment on that same node; i.e., a packet which is destined for user equipment 111 of network node 105 and which is received from user equipment 110 via input 123 would be routed to user equipment 111 via output 126 of network node 105. However, packets received at any of the network nodes 103-105 from associated user equipment 106-114 which are destined for user equipment associated with a different network node than the network node at which the packet was received are multiplexed and transmitted over a communications link through one or more cross connect switches 100-102 to the network node for which they are destined, as described in more detail later herein.

Figure 2:
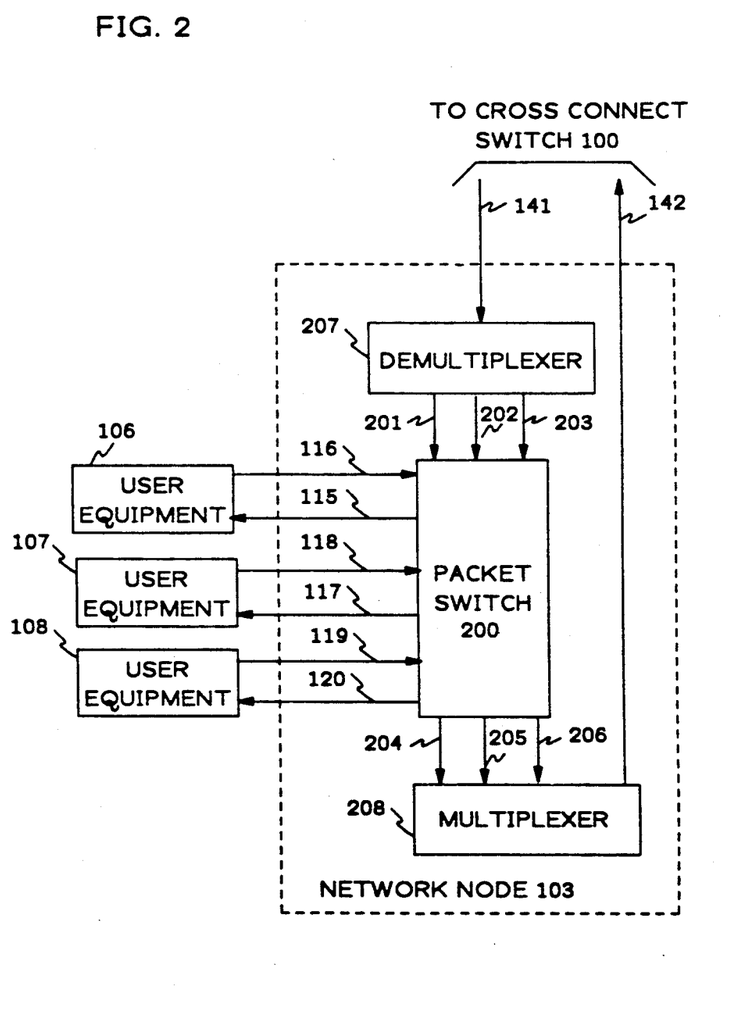
FIG. 2 shows a block diagram of a portion of an exemplary network node of FIG. 1.

The internal workings of an exemplary network node 103 are shown in block diagram form in FIG. 2, and are described in detail below. The exemplary network node 103 shown in FIG. 2 comprises a packet switch 200, including inputs 116, 118, 119, 201, 202, and 203, and outputs 115, 117, 120, 204, 205 and 206. The exemplary network node also includes multiplexing means 208 and demultiplexing means 207. Inputs 116, 118, and 119 are arranged to receive data from user equipment 106-108 respectively, and outputs 113, 117, and 120 are arranged to transmit data to user equipment 106-108, respectively. Communications link 141 is arranged to supply a multiplexed data signal, including, for example, three data channels, to demultiplexing means 207, which demultiplexes the data signal and supplies each demultiplexed channel from the data signal to a separate input 201-203 of packet switch 200. Multiplexing means 208 receives an exemplary three outputs 204-206 from packet switch 200 and multiplexes them onto communications link 142 for transmission to a cross connect switch 100, described herein.

In operation, each of the user equipment 106-108 transmits data packets to a separate input of packet switch 200. Packet switch 200 examines the address in each packet and determines if the packet is destined for a user equipment 106-108 associated with packet switch 200. If so, the packet is transmitted to the proper output 115, 117, or 120 of the packet switch. If however, the packet is destined for a user equipment associated with a different packet switch, the packet is transmitted to multiplexing means 208, where it is multiplexed along with other packets from other ones of user equipment 106-108, and the multiplexed packets are transmitted to a cross connect switch 100 (not shown in FIG. 2) by means of high speed communications link 142. It is to be understood that network nodes 104 and 105 operate in a similar manner with their associated user equipment and cross connect switch.

Figure 3:
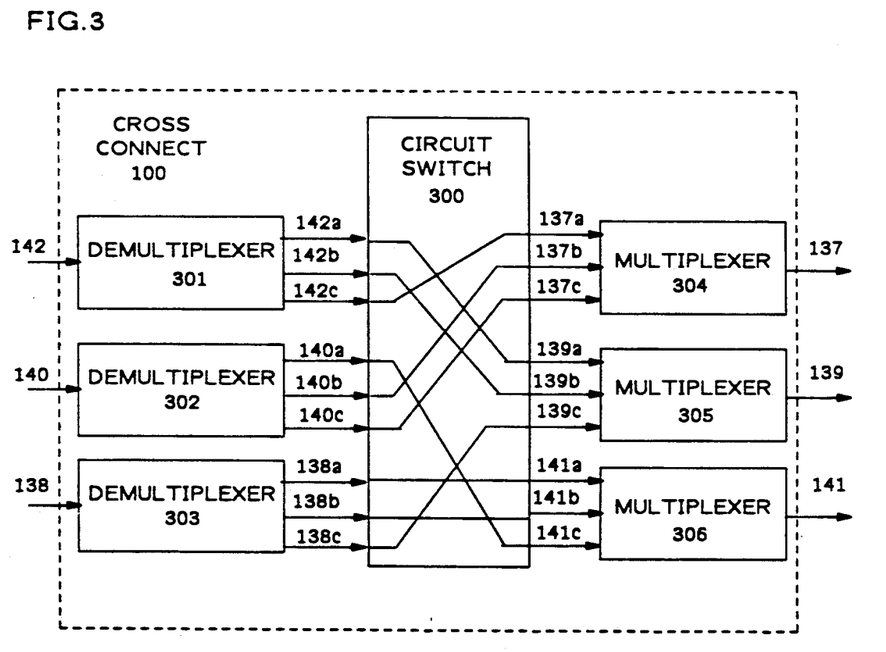
FIG. 3 shows exemplary channel assignments among communications links in a cross connect switch in accordance with the invention.

Returning to FIG. 1 each of the high speed communications links 133-144 comprises a plurality of data channels, and each channel is used to communicate one packet at a time, sequentially, from a source to a destination. All data packets communicated over any particular channel are destined for the same network node. The cross connect network 145, comprised of cross connect switches 100-102, establishes communications for each channel from a multiplexing means in a first network node to a demultiplexing means in another network node by directly translating a channel from a first communications link to a separate channel of a second communications link. An example of the channel switching as performed by cross connect switch 100 is shown in FIG. 3. Each of communications links 137-142 of FIG. 3 comprises three exemplary multiplexed channels numbered, 137a,b,c; 138a,b,c; 139a,b,c; 140a,b,c; 141a,b,c; 142a,b,c, respectively. The transmission speed of all the communications links 137-142 is assumed to be equal, and all incoming multiplexed channels to cross connect switch 100 are assumed to be translated to outgoing channels from cross connect switch 100. One exemplary configuration for the cross connect switch is shown in Table 1 below, and is depicted graphically in FIG. 3.

TABLE 1

| From channel | To channel |
|---|---|
| 142a | 139a |
| 142b | 139b |
| 142c | 137a |
| 140a | 141c |
| 140b | 137b |
| 140c | 137c |
| 138a | 141a |

TABLE 1-continued

| From channel | To channel |
|---|---|
| 138b | 141b |
| 138c | 139c |

A separate multiplexed data signal is received at each of the demultiplexing means 301-303 by means of communications links 142, 140, and 138, respectively. Each demultiplexing means 301-303 demultiplexes the incoming multiplexed data signal into an exemplary three data channels 142a-c, 140a-c, and 138a-c, respectively, and supplies each of the data channels to circuit switch 300. Circuit switch 300 is used to establish semipermanent connections between input channels 142a-c, 140a-c, and 138a-c and output channels 137a-c, 139a-c, and 141a-c. More particularly, although circuit switch 300 does not perform packet switching, it is possible to occasionally reconfigure the network by changing the connections within circuit switch 300; i.e., connecting the input channels to different output channels. Circuit switch 300 could even be a manually reconfigurable patch-panel, or could be permanently installed cabling, although this would make reconfiguration more cumbersome. The particular connections within circuit switch 300 may be established depending upon traffic demands within any particular network, and may be periodically reconfigured during specified periods of high traffic as for example, during business hours.

The exemplary nine data channels 142a-142c, 140a-140c, and 138a-138c are transmitted through circuit switch 300 for retransmission over communications links 137, 139 and 141. More particularly, multiplexing means 304-306 each receive an exemplary three data channels from circuit switch 300, and each generate a new multiplexed data signal from their respective three received data channels. Note that several channels which enter the switch on the same communications link, exit the switch on different communications links. Channels 142b and 142c for example, both enter the cross connect switch 100 on communications link 142 but exit on communications links 139 and 137, respectively. In general, the entire cross connect network 145 comprises any configuration which receives data on a plurality of communications links, each of which comprises one or more multiplexed channels, outputs the data from each channel to a separate output channel, and transmits a separate plurality of output channels over each of a plurality of communications links. Such devices are known within the art of circuit communications and are exemplified by the AT&T Digital Access and Cross-Connect System (DACS), but are not used in the design of packet switching networks.

Returning again to FIG. 1, multiplexed data signals received from network nodes 103-105 by cross connect switches 100-102 are routed through the cross connect switches in the manner described until reaching the particular network node associated with the user equipment for which the packet is destined. An important feature of the invention is that the cross connect switches do not perform any packet switching, but rather establish circuits. More particularly, each channel on a particular communications link is transferred to a particular new channel on a new link by the cross connect switch. The cross connect switch does not examine packet addresses, as does a fast packet switch for example. Thus, the channel upon which the data appears when it leaves the network node uniquely determines the destination network node that the data will be transmitted to. When a multiplexed data signal arrives at a network node, the signal is demultiplexed and each of the channels is routed to an input of the packet switch at the destination network node. Only when data from a particular channel reaches its destination packet switch is the address in the packet header examined and the packet switched to the proper output of the destination packet switch. Further, it should be noted that the multiplexed data signal which arrives at the demultiplexing means input of any packet switch is comprised of data channels which originated at various other packet switches.

Note that after the data is demultiplexed and transmitted to an input of a packet switch on the network, this packet switch may route the data to one of its outputs which is connected to a multiplexer, thereby routing the packet back onto the network. More particularly, and with reference to FIG. 1, suppose that cross connect network 145 is arranged such that none of the channels on communications link 144 are transmitted to network node 104. This might be the case, for example, if the normal traffic from network node 105 to network node 104 was so light that it didn't justify a dedicated channel. In this case, when a packet needs to be transmitted to node 104 from node 105, the packet could be multiplexed with packets that were destined to node 103, for example, and sent to node 103 through the cross connect network 145. At node 103, it would be demultiplexed with the rest of the incoming data signal as FIG. 2 shows, and the exemplary packet would appear on one of the inputs 201-203 of packet switch 200 at network node 103. The address in the exemplary packet would inform packet switch 200 that this exemplary packet, unlike the other data demultiplexed by demultiplexer 207 of FIG. 2, is destined for another network node. Packet switch 200 would then route the packet out one of its associated outputs 204-206 for transmission over the cross connect network 145 to network node 104. This intermediate network node concept could even be extended to include a plurality of network nodes so that several intermediate stops are required before the packet reaches its destination. Although this results in slightly longer packet delay, it eliminates the need to establish a channel between each pair of network nodes that need to communicate with each other.

Figure 4:
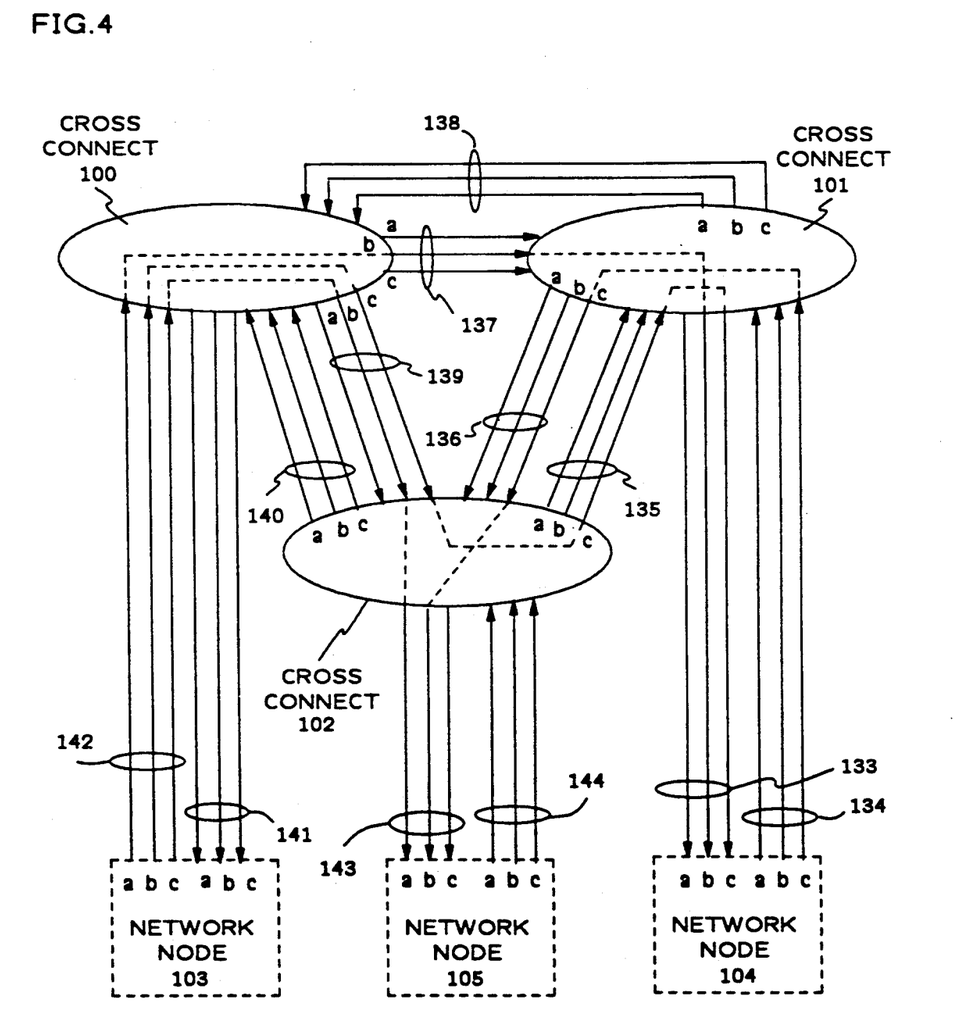
FIG. 4 shows several exemplary channel assignments in a network in accordance with the invention.

The operation of the network may be clarified through the use of several examples. FIG. 4 shows the exemplary network of FIG. 1 in a slightly different form. More particularly, each channel is shown separately in FIG. 4, with those channels which are physically located on the same communications link being grouped together. The exemplary connections within the cross connect switches of FIG. 4 are also different than the exemplary connections of FIG. 3. Each communications link is shown as comprising three multiplexed channels, using for example, Time Division Multiplexing (TDM). Several of the channel connections through the cross connect switches 100-102 are shown, and it is to be understood that there are other connections through the cross connect switches which are not shown for the purpose of clarity. As a first example, consider the transmission of a packet of data from a user equipment associated with network node 103 to a user equipment associated with network node 105. The packet is received at network node 103, which determines that the packet is not destined for any of the user equipment connected to network node 103 but is destined for a user equipment on network node 105. The packet is inserted into channel 142c for transmission through cross connect switch 100 onto channel 139b. It is further emphasized that the connection of channel 142c to 139b is a circuit, with no regard or relevance being given to any addresses in the packets transmitted therebetween. The exemplary packet is transmitted from channel 139b to channel 143a by cross connect switch 102 in a similar manner. Communications link 143 then transmits a multiplexed data signal to a demultiplexing means associated with network node 105 where it is demultiplexed and each of the channels 143a-143c are supplied to separate inputs of the associated packet switch as described previously. It should be noted that communications link 143 contains packets which have originated at different network nodes. More particularly, note that although channel 143a comprises data from network node 103, channel 143b comprises data from network node 104.

As a second example, consider the transmission of a packet from network node 103 to network node 104. The packet switch associated with network node 103 would receive the packet from an associated user equipment and based upon the address in the packet, would determine that the packet can reach its proper destination by being routed to the output of the packet switch which corresponds to either channel 142a or 142b. In the former case, FIG. 4 shows that the packet would be transmitted from channel 142a to channel 137b by cross connect switch 100, from channel 137b to channel 133b by cross connect switch 101, and finally supplied by communications link 133 to a demultiplexing means at network node 104. The operation of network node 104 and its components is analogous to that already described for network node 103. If the exemplary packet were transmitted by network node 103 via channel 142b, it would be transmitted by cross connect switch 100 to channel 139c, received by cross connect switch 102 and forwarded to channel 135c, and finally transferred from channel 135c to channel 133c by cross connect switch 101.

The cross connect switches 100-102 described have another important advantage which helps to manage the network, and control congestion. The circuits established may be easily reconfigured, allowing dynamic resource allocation in response to changing traffic patterns. More particularly, if traffic between a specific pair of network nodes grows heavy, the cross connect switches can easily be reprogrammed in order to change the cross connects and thus provide extra channels between these network nodes, or to provide less channels between network nodes which have a lighter traffic load.

Figure 5:
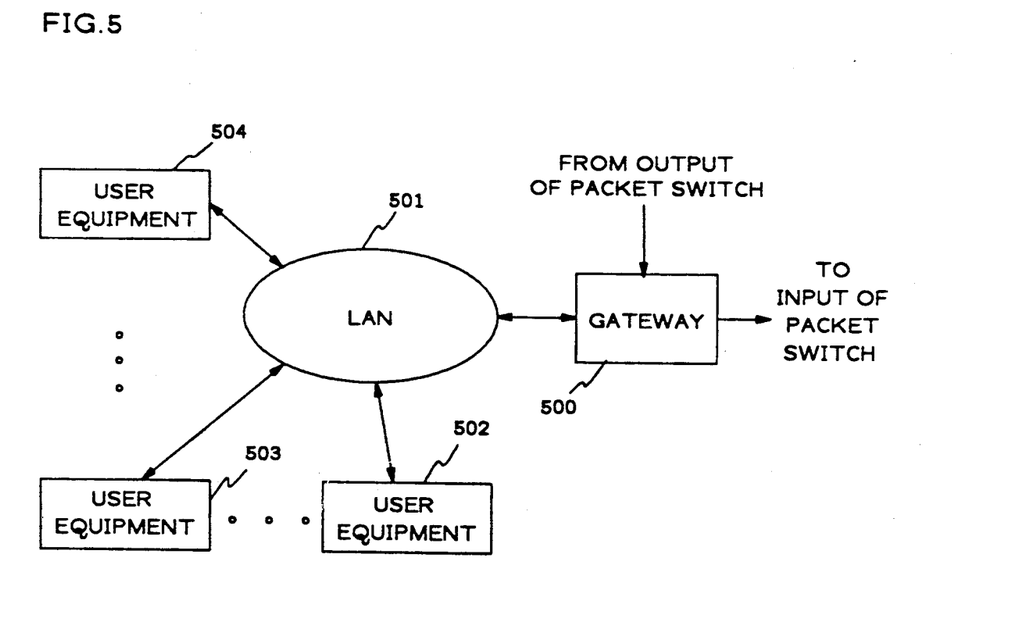
FIG. 5 shows an exemplary embodiment of the invention wherein a Local Area Network (LAN) gateway is incorporated into the network of FIG. 1.

In another embodiment of the invention, shown in FIG. 5, one or more of the exemplary user equipment 106-114 may be replaced with gateways to a Local Area Network (LAN) which itself supports a plurality of user equipment. FIG. 5 shows a block diagram of a portion of such a network with exemplary user equipment 502-504. Packets are communicated among user equipment which are connected to the same LAN 501 by means of the medium and protocol associated with LAN 501. Packets destined for user equipment not connected to LAN 501 are received by gateway 500 and transmitted to the input of a packet switch. Thereafter, each of the packets is treated as described above. Gateways for most commercially used LANs are available off-the-shelf, and are normally used to interface the user equipment associated with the LAN to other user equipment associated with other LANs by means of a long haul packet network.

It is to be understood that the examples given herein are for illustrative purposes only and that other variations are easily constructed without violating the spirit and scope of the invention. For example, multiplexing may be accomplished through some other means rather than TDM. Each node could be equipped with multiplexing means such that more than one multiplexed data signal is supplied from each node, and each multiplexed data signal may be transmitted to the same or a different cross connect switch. Further, each cross connect switch may accept multiplexed data signals from a plurality of different network nodes. The system of cross connect switches may be configured to interconnect different multiplexed signals from different network nodes in any manner consistent with the particular traffic demands of the network. The important point is that the system of cross connect switches is a network for transferring channels of multiplexed signals to new channels of new multiplexed signals. Other types of equipment may be connected to the network rather than using only a LAN gateway or a network node as described herein. For example, one or more of the network nodes could be replaced by a multiuser computer system or some other type of data packet router for selectively routing packets to the multiplexing means. Also, the communications links may be established using any combination of lightwave, microwave, etc. transmission media.

We claim:

1. A communications network for packets comprising:
    at least three network nodes; and
    cross-connect means;
    the at least three network nodes connected to the cross-connect means via communication links,
    each of the at least three network nodes comprising (i) a packet switch having a plurality of outputs adapted for supplying individual signals comprising packets and (ii) means for forming first multiplexed signals from the individual signals supplied by at least two of the outputs, each of the at least two outputs being designated to supply individual signals destined immediately for different predetermined ones of the network nodes, the first multiplexed signals comprising predetermined identifiable channels into which the individual signals are placed,
    the communication links including links for transmitting the first multiplexed signals from the network nodes to the cross-connect means,
    the cross-connect means including means for forming, from the first multiplexed signals, second multiplexed signals comprising identifiable channels into which the individual signals are placed, the immediate destination of each individual signal in a particular one of the second multiplexed signals being the same one of the network nodes, the structure of the second multiplexed signals being arranged in a predetermined manner, said manner being based upon in which of the first multiplexed signals and in which of the channel positions therein the individual signals were transmitted to the cross-connect means and said manner being independent of any information in any packet supplied from the network nodes.

2. The invention as described in claim 1 wherein the cross-connect means includes:
    a plurality of inputs, each input of a subset of the inputs being arranged to receive a separate first multiplexed signal from a separate one of the communications links;
    means for combining individual signals that were included in the first multiplexed signals to generate a plurality of the second multiplexed signals that include the individual signals arranged such that at least one of the plurality of the second multiplexed signals includes at least two individual signals which had been received in first multiplexed signals from separate network nodes; and
    means for transmitting each of the second multiplexed signal over separate ones of the communications links.

3. The invention as described in claim 1 wherein the packet switch further includes inputs for receiving packets to be switched to the outputs.

4. The invention as described in claim 3 wherein the packet switch further includes a subset of inputs for receiving packets to be switched to the outputs, at least one input of the subset for and corresponding to each of the individual signals that are being received in one of the second multiplexed signals which is being supplied via at least one of the communications links from the cross-connect means.

5. The invention as described in claim 4 wherein each of the network nodes further include means for reconstructing the individual signals received in the second multiplexed signal from the transmitting communications links.

6. The invention as described in claim 5 wherein each of the network nodes further includes means for reconstructing the packets of the individual signals and means for supplying the packets to one of the inputs corresponding to the individual signal from which the packet was reconstructed.

7. The invention as described in claim 5 wherein the means for reconstructing and the means for supplying are included in a demultiplexer.

8. The invention as described in claim 1, 2, 3, 4, 5, 6 or 7 wherein the cross-connect means includes a plurality of cross-connect switches.

9. The invention as described in claim 1, 2, 3, 4, 5, 6 or 7 wherein at least one of the plurality of outputs of at least one of the network nodes, is supplying its individual signal to a Local Area Network (LAN) gateway.

10. The invention as described in claim 3, 4, 5, 6 or 7 wherein at least one of the network nodes is interconnected with user equipment, and the packet switch in such at least one network node receives packets from the user equipment at a second subset of the inputs, the packets having a specified destination address and containing information which originated at the user equipment, the packet switch routing the packets to the plurality of outputs, so as to form the individual signals, in accordance with the destination address.

11. The invention as described in claim 3, 4, 5, 6 or 7 wherein a subset of at least one of the inputs is receiving packets from a Local Area Network (LAN) gateway.

12. The invention as described in claim 8 wherein at least one of the plurality of outputs of at least one of the network nodes, is supplying its individual signal to a Local Area Network (LAN) gateway.

13. The invention as described in claim 8 wherein at least one of the network nodes is interconnected with user equipment, and the packet switch in such at least one network node receives packets from the user equipment at a second subset of the inputs, the packets having a specified destination address and containing information which originated at the user equipment, the packet switch routing the packets to the plurality of outputs, so as to form the individual signals, in accordance with the destination address.

14. The invention as described in claim 8 wherein a subset of at least one of the inputs is receiving packets from a Local Area Network (LAN) gateway.

15. The invention as described in claim 9 wherein at least one of the network nodes is interconnected with user equipment, and the packet switch in such at least one network node receives packets from the user equipment at a second subset of the inputs, the packets having a specified destination address and containing information which originated at the user equipment, the packet switch routing the packets to the plurality of outputs, so as to form the individual signals, in accordance with the destination address.

16. The invention as described in claim 9 wherein a subset of at least one of the inputs is receiving packets from a Local Area Network (LAN) gateway.

17. The invention as described in claim 10 wherein a subset of at least one of the inputs is receiving packets from a Local Area Network (LAN) gateway.

* * * * *